March 6, 1934. E. HOPKINSON 1,949,473
METHOD AND APPARATUS FOR FORMING RUBBER ARTICLES
Filed July 24, 1930 5 Sheets-Sheet 1
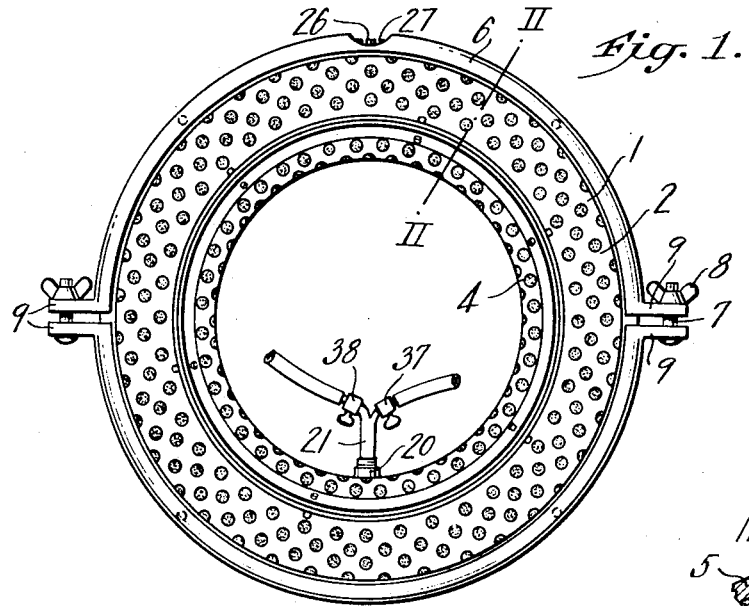
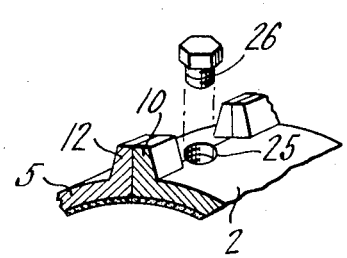
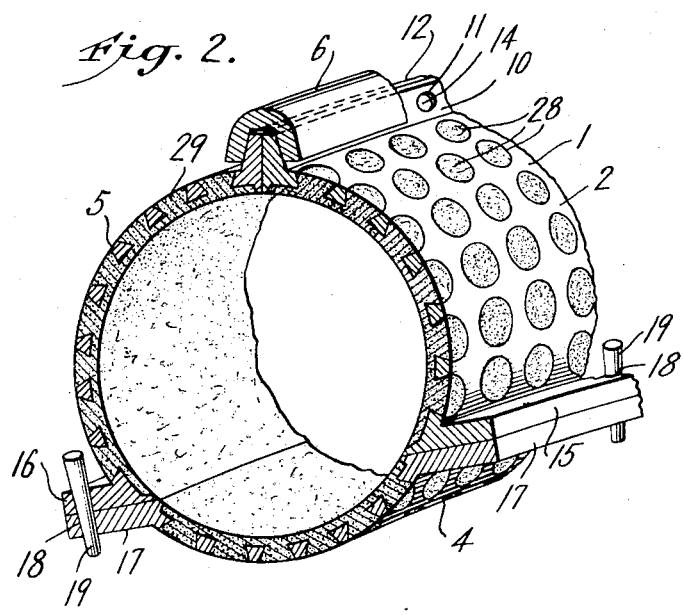
INVENTOR
Ernest Hopkinson
By Walter S. Pipes
Attorney March 6, 1934.  E. HOPKINSON  1,949,473
METHOD AND APPARATUS FOR FORMING RUBBER ARTICLES
Filed July 24, 1930  5 Sheets-Sheet 2
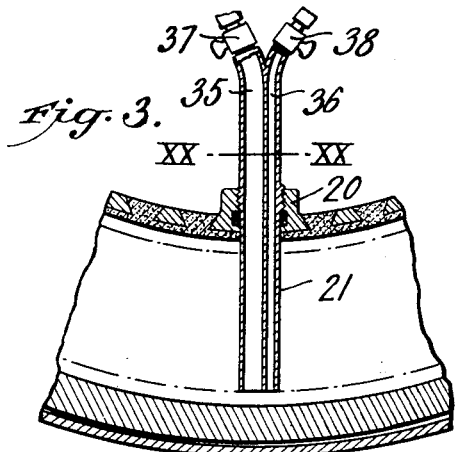
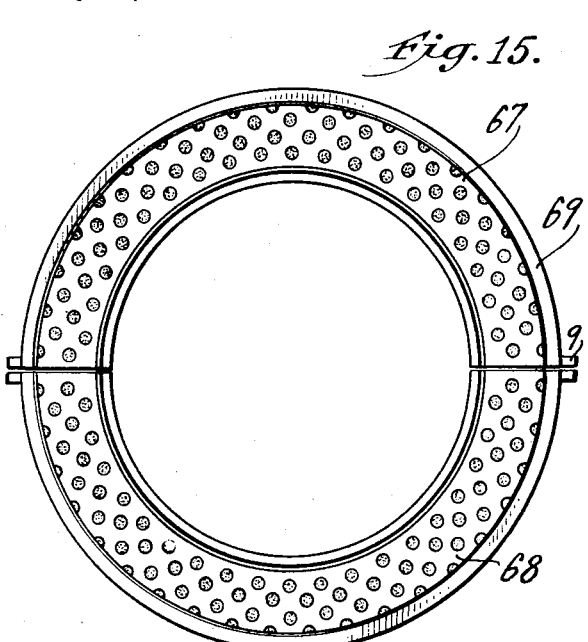
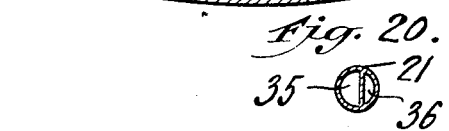
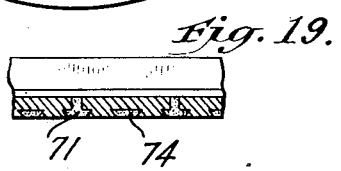
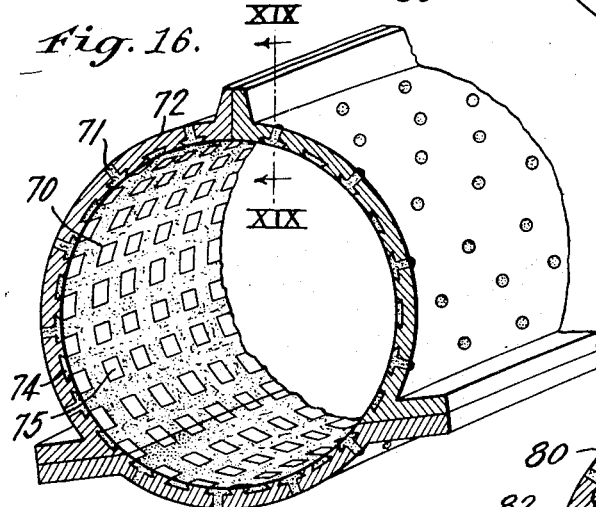
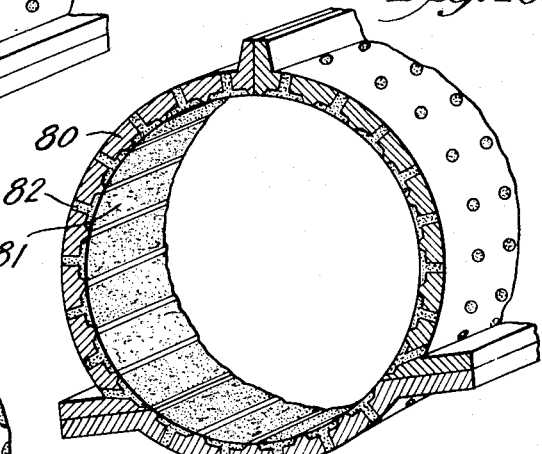
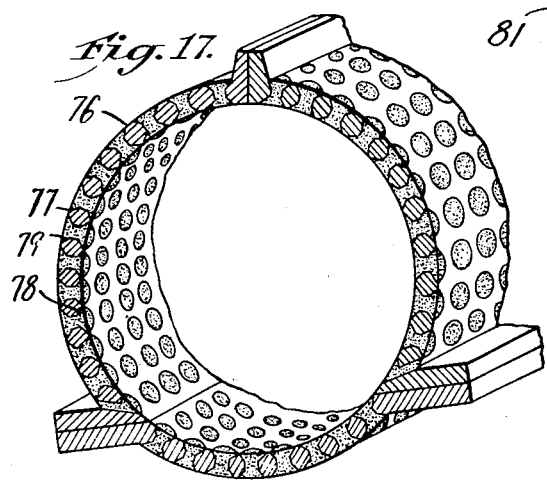
INVENTOR
Ernest Hopkinson
By Walter L. Pipes
Attorney March 6, 1934.  E. HOPKINSON  1,949,473
METHOD AND APPARATUS FOR FORMING RUBBER ARTICLES
Filed July 24, 1930   5 Sheets-Sheet 3

INVENTOR
Ernest Hopkinson
BY
ATTORNEY

March 6, 1934.  E. HOPKINSON  1,949,473
METHOD AND APPARATUS FOR FORMING RUBBER ARTICLES
Filed July 24, 1930  5 Sheets-Sheet 4

INVENTOR
Ernest Hopkinson
Attorney

March 6, 1934.  E. HOPKINSON  1,949,473
METHOD AND APPARATUS FOR FORMING RUBBER ARTICLES
Filed July 24, 1930    5 Sheets-Sheet 5
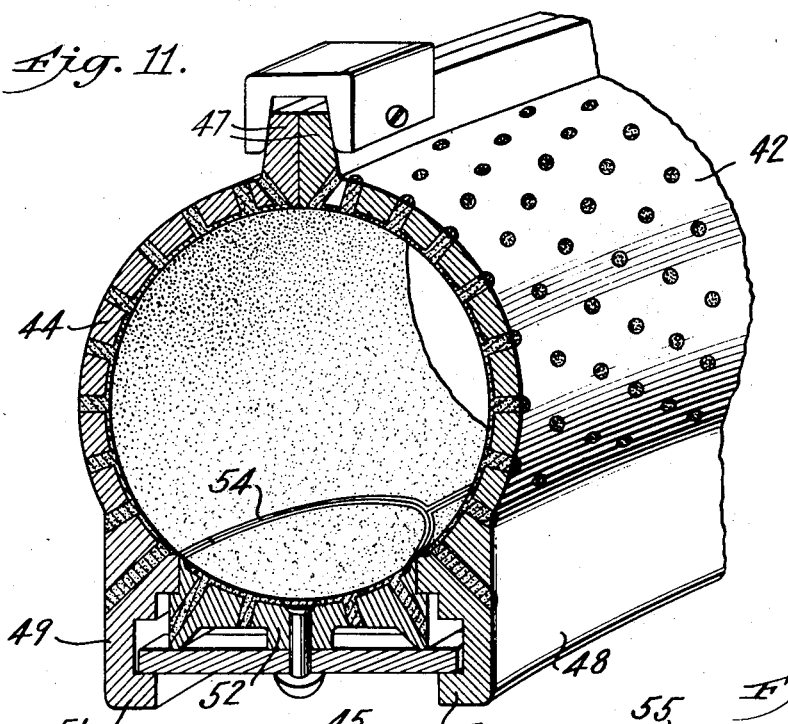
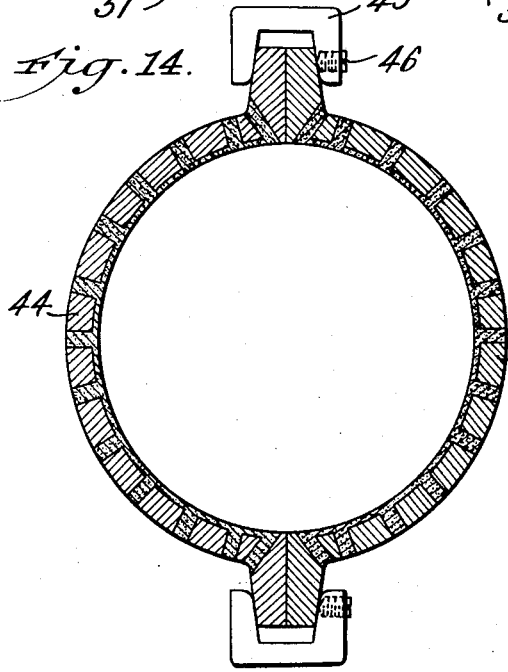
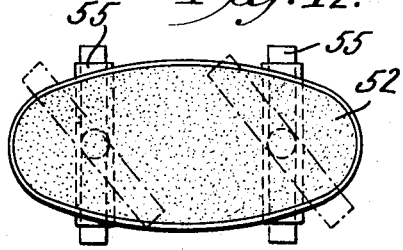
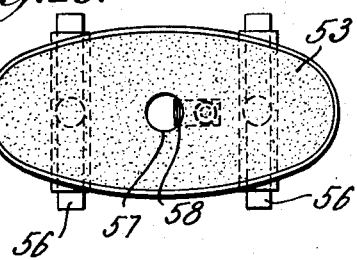
INVENTOR
Ernest Hopkinson
Attorney Patented Mar. 6, 1934

1,949,473

UNITED STATES PATENT OFFICE

1,949,473

METHOD AND APPARATUS FOR FORMING RUBBER ARTICLES

Ernest Hopkinson, New York, N. Y., assignor to United States Tire Company, Incorporated, Indianapolis, Ind., a corporation of Indiana Application July 24, 1930, Serial No. 470,308

7 Claims. (Cl. 18—41)

My invention relates to methods and apparatus for forming rubber articles, and more particularly to methods and apparatus for forming inner tubes.

The present invention relates to the manufacture of hollow articles, and particularly inner tubes by the use of latex and/or latex compositions. The latex may be either natural or artificial latex.

I provide a mold or mandrel having an inner lining of porous material into which a definite quantity of latex is inserted. The mold is then turned, preferably by rotation, to cause the latex to engage and form a coating over the porous material as the liquid content of the latex is absorbed. If desired, the action may be expedited by the introduction of a gaseous medium, such as air under pressure within the mold.

Where it is desired to provide a thicker wall at one portion of the article than at the other, the turning movement may be controlled so as to have the latex engage the portion or area of the article where the thickened wall is desired after the latex no longer engages other portions or areas. In the case of an inner tube where it is desired to have the outer circumference or wall thickened, this result is obtained by regulating the amount of latex introduced into an annular mold so that the inner circumference or periphery of the annular mold is above the level of the latex during the later stages of the rotation or turning of the mold.

The accompanying drawings illustrate certain present preferred examples of apparatus for practicing the invention as applied to the manufacture of inner tubes, in which Figure 1 is a side elevational view of a mandrel for forming inner tubes;

Fig. 2 is a cross sectional view thereof taken substantially along the section line II—II of Fig. 1;

Fig. 3 is a longitudinal sectional view of a portion thereof showing means for communicating between the interior and exterior thereof;

Fig. 4 is a detail view showing the locking means for maintaining the mold sections in assembled relation;

Fig. 5 is a perspective view showing a portion of the mold and means for permitting the escape of air from the mold while being filled;

Fig. 11 is a transverse view in perspective of a portion of the mold shown in Figs. 9 and 10;

Figs. 12 and 13 are plan views of different forms of replaceable sections for the mold shown in Figs. 9 and 11;

Fig. 14 is a transverse sectional view taken substantially along the section line XIV—XIV of Fig. 9;

Fig. 15 is a side view of a transversely split mold;

Figs. 16, 17 and 18 are transverse views in perspective of modified forms of molds showing different applications of the lining;

Fig. 19 is a longitudinal sectional view of a portion of the mold illustrated in Fig. 16, taken along the section line XIX—XIX of Fig. 16; and Fig. 20 is a cross sectional view of the communicating means taken substantially along the section line XX—XX of Fig. 3.

Figure 6:
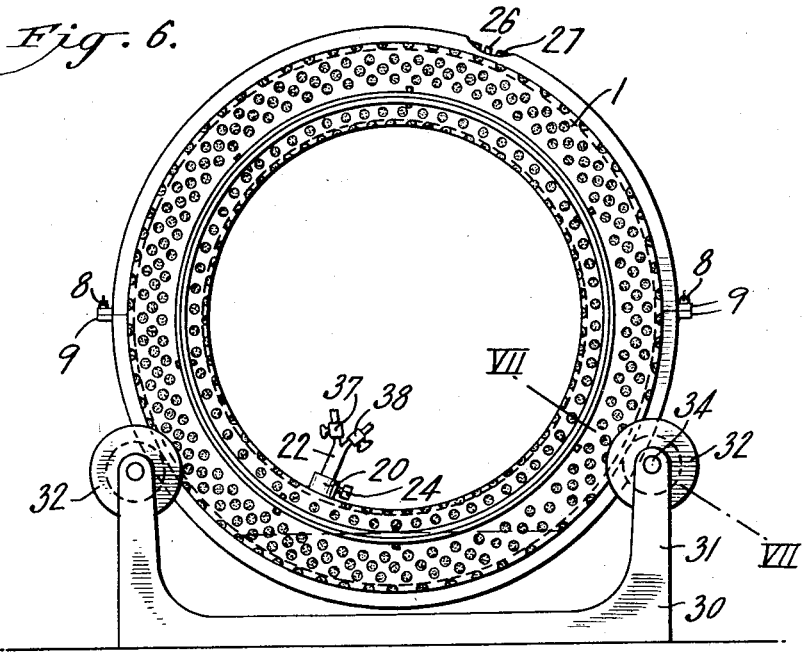
Fig. 6 is a side view of the mold shown in Fig. 1 resting on apparatus for rotating or turning it.
Figure 7:
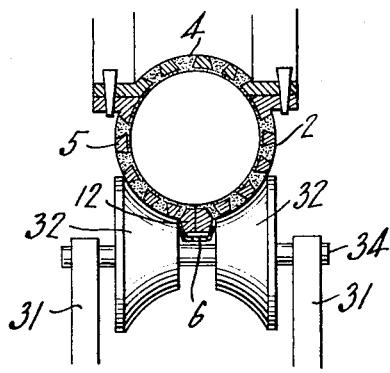
Fig. 7 is a transverse sectional view taken substantially along the section line VII—VII of Fig. 6.

Referring particularly to Figs. 1 to 8, inclusive, a mold or hollow mandrel 1 comprises a plurality of complementary sections 2, 4 and 5. These sections are of annular form and the sections 2 and 5 constitute the upper portions of the mold which is closed by the lower section 4. The sections 2 and 5 are provided along their abutting edges with flanges for the reception of a clamping ring 6. The clamping ring 6 may comprise two similar sections which are brought together by bolts 7 and wing nuts 8 bearing against flanges 9 at the ends of the clamp sections. The flange 10 on the section 2 is provided with openings 11 tapering outwardly toward the flange 12 of the section 5, as is shown in Fig. 4. The flange 12 carries tapering lugs 14 which fit into the openings 11 to secure and center the sections 2 and 5.

For securing the section 4 to the sections 2 and 5, the latter are provided at their lower edges with flanges 15 and 16, respectively, which engage complementary flanges 17 on the section 4. The flanges 15, 16 and 17 are provided with aligned tapering openings 18 for the reception of drift pins 19 which, when inserted, prevent the relative movement of the sections. As the sections 2 and 5 are held by the clamping ring 6 against the inner section 4 when assembled, and as the several sections are secured against movement relative to each other, a substantially ridged mold is obtained.

For providing communication between the interior and exterior of the mold when assembled, the section 4 is provided with a collar 20 for the reception of a filling tube 21, as shown in Fig. 1. A clamping screw 24 may be provided for holding the tube in place, although it is preferably threaded as shown in Fig. 3. If desired, the mold may be provided with a threaded opening 25, as shown in Fig. 5 for the reception of a screw 26. Upon removal of the screw 26 air may escape from the mold. As shown in Fig. 1, the clamping ring 6 is cut away as at 27 to expose the head of the screw 26.

In order to provide a porous lining for the mold, the several sections 2, 4 and 5, which are of metal, are provided with a plurality of perforations 28. Preferably, the openings 28 are tapered so that upon the application of a porous compound 29 to the openings and the inner surfaces of the sections, and then heat treatment, the lining is keyed to the sections. A suitable material for the lining 29 is a composition of bakelite and celite. Bakelite is a well known phenolic condensation product and celite is a diatomaceous earth having porous characteristics. The bakelite acts as a bond for the diatomaceous earth without imparing its porosity. Preferably, the several sections are lined and are then assembled in pairs and their abutting edges are trued by an abrading tool so as to secure an exact fit without the presence of pronounced seams at the joints.

Referring to Fig. 6, the mold 1 is turned in a cradle 30 having a plurality of arms 31 supporting grooved rollers 32 which conform to the external contour of the mold. By spacing the rollers 32 on a supporting shaft 34 a space is provided for the flanges 10 and 12 and the clamping ring 6.

In the manufacture of an inner tube the mold is first assembled after which a clay slip or other suitable material is poured into the mold through the collar 20. A closure, preferably a threaded plug, is then inserted into the collar 20 and the mold is rotated in the cradle 30 so that the clay slip flows around the entire inner surface of the mold and fills the slight curves between the abutting parts and coats the entire surface with a porous clay deposit. If a thick deposit of clay is desired the mold may be rotated in a vacuum chamber. The moisture in the slip is absorbed by the bakelite-celite lining and tends to escape through the perforations 28 in the mold sections.

After the desired deposit of clay is obtained on the surfaces of the sections, excess clay may be drawn out by a vacuum tube inserted through the collar 20.

After the application of the clay lining the filling tube 21 is threaded into the collar 20. The filling tube 21 comprises a channel 35 of greater cross sectional area than a companion channel 36. The channel 35 is preferably for the introduction of latex, while the channel 36 is for the introduction of fluid under pressure. The channels terminate in separate valves 37 and 38, respectively, to which flexible pipe lines may be connected. The valve 37 is opened and a latex bath is introduced. Preferably, the latex is introduced against the pressure of the air confined in the mold, although, if desired, the screw 26 may be removed to permit the escape of excess air. The latex used may be either a natural or artificial latex, either with or without vulcanizing ingredients. Such a latex contains a high percentage of an aqueous phase in addition to the rubber content. The aqueous phase must be removed by absorption through the clay and bakelite-celite lining. Preferably, the amount of latex introduced is just sufficient to complete a single inner tube. If it is necessary to trap the air in the mold, the mold is given an initial complete rotation to give the entire surface of the mold a preliminary sealing coating. The latex is preferably introduced when the tube 21 is at the bottom of the mold when the latter is resting on the rollers 32. The valve 37 is then closed and the mold is rotated through substantially 180° when air or other gas under pressure is introduced through the valve 38 and tube 36.

The volume of gas introduced is sufficient to insure a pressure in excess of atmospheric pressure within the mold during the coating operation hereafter described. The presence of this excess pressure expedites the absorption of the liquid and also prevents the ingress of air through the porous material as the quantity of liquid within the mold is lessened, which would destroy the continuity of the deposit. The air is preferably introduced when the tube 21 is at its top position to prevent bubbling of the latex.

Upon closure of the mold after insertion of the gas or air through the valve 38, the mold is slowly rotated in the cradle 30. At first the volume of liquid latex is sufficient to engage the entire lining of the mold when it is turning. The aqueous phase is drawn off through the linings leaving a continuous coating or deposit of rubber on the inner surface of the mold. As the level of the latex recedes there comes a period when the latex does not engage the inner surface of the mold. After this period the deposit of rubber is confined to progressively smaller areas along the outer surface of the mold to produce a gradually thickening outer peripheral wall in the tube.

Figure 8:
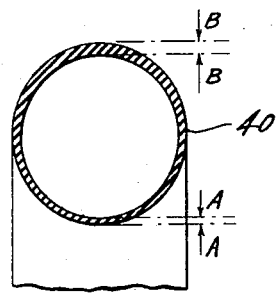
Fig. 8 is a transverse sectional view of a portion of an inner tube manufactured in accordance with the present invention and illustrating the difference in the thicknesses of the inner and outer walls thereof.
Figure 9:
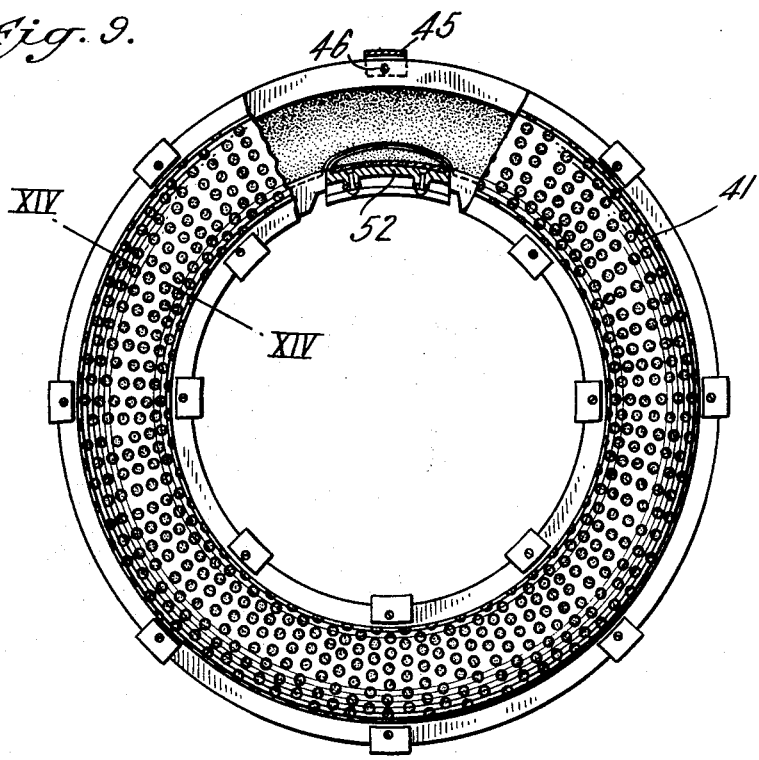
Fig. 9 is a side elevational view of a modified form of mold.
Figure 10:
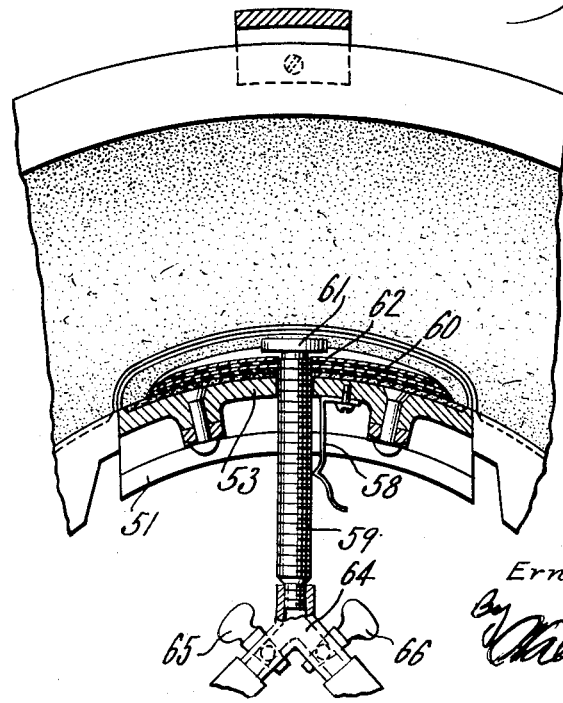
Fig. 10 is a view partially in elevation and partially in section along substantially the medial plane of the mold shown in Fig. 9.

Referring to Fig. 8, the resultant inner tube 40 has an inner thickness indicated by the arrows A—A and a greater outer thickness indicated by the arrows B—B. For the formation of very thick tubes the mold may be placed in a vacuum chamber during the period it is turning on the cradle.

After the rubber is deposited, the mold and contained tube are dried. If necessary additional pressure is applied to the interior of the mold for holding the rubber deposit in an extended position against the mold sections during the drying operation. The tube may also be vulcanized in the mold, or the tube may be removed from the mold after drying and vulcanized in any other manner. The tube is removed by releasing the clamping ring 6, loosening the drift pins 19 and removing the sections 2 and 5. In this form of the invention a valve stem is inserted in the opening previously occupied by the filling tube 21.

The inner tube 40 produced by this method is continuous and seamless. It has no mold markings. By introducing the exact amount of latex with a solid content of rubber exactly sufficient for the desired tube, the necessity of emptying any excess latex from the mold is avoided. This construction and method also eliminates the necessity of having the mold continuously in connection with a source of latex and/or gaseous fluid under pressure.

In making a tube in accordance with the present invention it is possible to embed the valve stem and supporting patch in the tube as it is formed in the mold.

Referring to Figs. 9 to 14 inclusive, I have shown a mold 41 comprising two major circumferential sections 42 and 44. The mold sections 42 and 44 are perforated and lined in the same manner as the mold previously described. The sections 42 and 44 are preferably held together by C-clamps 45 having set screws 46 engaging flanges 47 on the sections 42 and 44 in lieu of the clamping ring shown in Fig. 1. On the inner circumferences of the sections 42 and 44 they are provided with flanges 48 and 49, respectively, for a portion of their circumferences. The flanges 48 and 49 terminate in transversely projecting shoulders 50 and 51, respectively. These flanges constitute seats for replaceable mold sections 52 and 53 shown in Figs. 12 and 13, respectively. The replaceable sections 52 and 53 fit into substantially an elliptical seat 54 formed in the edges of the sections 42 and 44.

During the period when the clay lining is applied to the mold the section 52 is placed in the seat 54. The section 52 presents a continuous surface and is secured in position by pivotally mounted latches 55 which are turned to engage the shoulders 50 and 51 inclusive. The section 52 has a close fit with its seat 54 to avoid pronounced mold markings in the resulting tube.

After the mold has been lined and excess clay removed, if necessary, the replaceable section 53 is inserted in the seat 54 and secured by pivotally mounted latches 56 corresponding to the latches 55. The section 53 is provided with an opening 57 which closely fits the conventional valve stem. A spring 58 is carried on the outer or lower surface of the section for engaging a valve stem 59 and holding it in a definite position.

The section 53 is supplied with a plurality of layers of fabric 60 constituting a supporting patch for a valve stem which are placed over its inner surface. Preferably, the layers of fabric 60 are previously soaked in a latex or other rubber composition. A base 61 on the valve stem is held slightly above the exposed surface of the fabric 60 to provide a space 62 for a deposit of rubber between the base 61 and the fabric 60. The width of the space 62 is maintained definite by the engagement between the spring 58 and the valve stem 59.

After the valve stem and patch material have been assembled on the section 53, and it has been inserted in the seat 54, a connector 64 is attached to the end of the valve stem 59. The connector 64 is provided with valves 65 and 66, corresponding to the valves 37 and 38 for controlling the admission of latex and a gas under pressure to the interior of the mold. During and after the admission of latex and gas under pressure to the mold the steps of forming the inner tube are similar to those set forth in the description of the previous form of the invention.

An inner tube made with this form of apparatus has the valve stem automatically embedded in the wall and the fit of the rubber around the valve stem should be so perfect as to preclude the possibility of leakage.

Referring to Figs. 16 to 19 inclusive, I have shown different configurations and forms of the bakelite-celite linings for the sections. In Fig. 16 a bakelite-celite composition 70 extends through perforations 71 in the section of a mold 72, and also into anchoring seats 74 which do not extend through the mold walls. The portions 75 of the mold walls between the openings 71 and/or the seats 74 are not covered with the bakelite-celite composition, although they are subsequently covered with the clay slip. The edges of the openings 71 and 74 taper outwardly so as to form retaining keys in the bakelite-celite composition. This form of mold may be used where the aqueous phase in the latex is relatively small.

In Fig. 17 I have shown a portion of a mold 76 having openings 77 shaped to provide an inner anchoring portion 78 and an outer anchoring portion 79 on each of the bakelite-celite inserts. In Fig. 18 I have shown a mold 80 in which the bakelite-celite material, or other porous material is laid in the form of slabs 81 having plugs 82 extending outwardly through the openings in the mold sections.

It is to be understood that porous material other than bakelite-celite may be used in the molds shown in Figs. 16 to 18, and that the reference to the bakelite-celite composition is by way of example and not as a limitation of the invention.

While I have shown and described certain present preferred forms of apparatus for practicing the invention, it is to be understood that the invention may be practiced by other apparatus and means within the spirit thereof and the scope of the appended claims.

Having thus described my invention, what I claim and desire to protect by Letters Patent is:

1. A mold for shaping a hollow body comprising a plurality of complementary sections defining a cavity, one of said sections being replaceable for presenting a continuous unbroken inner surface of the cavity or for permitting an element to extend through the mold for communication between the exterior and interior thereof.

2. A mold for shaping a hollow body comprising a plurality of complementary sections defining a cavity, the adjacent edges of a pair of said sections being shaped to receive a replaceable section for completely closing the mold or for permitting communication through the replaceable section between the interior and exterior of the mold.

3. A mold for shaping an inner tube comprising a plurality of complementary sections, one of said sections being replaceable to present a continuous inner surface to the mold or to permit a valve stem to project through the mold.

4. An annular mold for shaping a hollow body comprising a plurality of complementary annular sections defining a cavity, one of said sections being replaceable for presenting a continuous unbroken inner surface to the cavity or for permitting an element to extend through the mold for communication between the exterior and interior thereof.

5. An annular mold for forming annular rubber articles comprising a plurality of complementary annular sections, the adjacent edges of a pair of said sections being shaped to receive a replaceable section for completely closing the mold or for permitting communication through the replaceable section between the interior and exterior of the mold, and means for latching said replaceable section to said pair of sections.

6. A replaceable mold section comprising a plate member having the general shape of a valve reinforcing patch, a filtering medium applied to one side of said member, and latching means carried by the other side of said member.

7. A replaceable mold section comprising a plate member having the general shape of a valve reinforcing patch, a filtering medium applied to one side of said member, an aperture in said member for receiving a valve stem, and means carried by the other side of said member for retaining a valve stem base in spaced relation to said member.

ERNEST HOPKINSON.